(12) United States Patent
Emerson, III

(10) Patent No.: US 6,700,884 B2
(45) Date of Patent: Mar. 2, 2004

(54) INTEGRATING THE INTERNET WITH THE PUBLIC SWITCHED TELEPHONE NETWORK

(76) Inventor: Harry E. Emerson, III, 27 Garden Ct., Succasunna, NJ (US) 07876

(*) Notice: Subject to any disclaimer, the term of this patent is extended or adjusted under 35 U.S.C. 154(b) by 17 days.

(21) Appl. No.: 10/176,476

(22) Filed: Jun. 20, 2002

(65) Prior Publication Data

US 2003/0002485 A1 Jan. 2, 2003

Related U.S. Application Data

(60) Provisional application No. 60/301,757, filed on Jun. 28, 2001.

(51) Int. Cl.$^7$ .............................................. H04L 12/66
(52) U.S. Cl. ..................................................... 370/352
(58) Field of Search ................................. 370/400, 351, 370/352, 353, 354, 355, 356

(56) References Cited

U.S. PATENT DOCUMENTS

| | | | |
|---|---|---|---|
| 5,652,783 A | 7/1997 | Keba et al. .................. | 370/313 |
| 5,724,412 A | 3/1998 | Srinivasan ............... | 379/93.23 |
| 5,805,587 A | 9/1998 | Norris et al. ................. | 370/352 |
| 5,907,547 A | 5/1999 | Foladare et al. ............ | 370/352 |
| 5,937,041 A | 8/1999 | Cardillo, IV et al. ..... | 379/93.25 |
| 5,995,606 A | 11/1999 | Civanlar et al. ............ | 379/201 |
| 6,031,904 A | 2/2000 | An et al. ...................... | 379/201 |
| 6,061,347 A | 5/2000 | Hollatz et al. ............... | 370/352 |
| 6,157,648 A | 12/2000 | Voit et al. .................... | 370/401 |
| 6,185,194 B1 | 2/2001 | Musk et al. .................. | 370/260 |
| 6,192,045 B1 * | 2/2001 | Williams et al. ............ | 370/352 |
| 6,243,373 B1 | 6/2001 | Turock ......................... | 370/352 |
| 6,278,704 B1 | 8/2001 | Creamer et al. ............. | 370/352 |
| 6,292,480 B1 | 9/2001 | May ............................. | 370/352 |
| 6,307,930 B1 | 10/2001 | Mayer .................... | 379/215.01 |
| 6,324,280 B2 | 11/2001 | Dunn et al. .................. | 379/230 |
| 6,327,267 B1 | 12/2001 | Valentine et al. ........... | 370/466 |
| 6,333,931 B1 | 12/2001 | LaPier et al. ................ | 370/385 |
| 6,335,927 B1 | 1/2002 | Elliott et al. ................. | 370/352 |
| 6,347,085 B2 | 2/2002 | Kelly .......................... | 370/352 |
| 6,381,320 B1 | 4/2002 | Creamer et al. ......... | 379/201.1 |
| 6,400,719 B1 * | 6/2002 | Chimura et al. ........ | 370/395.31 |
| 6,490,274 B1 * | 12/2002 | Kim ............................ | 370/352 |
| 6,539,077 B1 * | 3/2003 | Ranalli et al. ............. | 379/67.1 |
| 2001/0010690 A1 | 8/2001 | Shen .......................... | 370/352 |
| 2001/0012285 A1 | 8/2001 | Shaharabani et al. ....... | 370/352 |
| 2001/0032234 A1 | 10/2001 | Summers et al. ........... | 709/201 |
| 2001/0055299 A1 | 12/2001 | Kelly .......................... | 370/352 |
| 2002/0024943 A1 | 2/2002 | Karaul et al. ............... | 370/338 |
| 2002/0041590 A1 | 4/2002 | Donovan ..................... | 370/352 |
| 2002/0057672 A1 | 5/2002 | Komuro ...................... | 370/352 |
| 2002/0057677 A1 | 5/2002 | Katzschner et al. ........ | 370/352 |

* cited by examiner

Primary Examiner—Kenneth Vanderpuye
(74) Attorney, Agent, or Firm—Ernest D. Buff & Associates, LLC; Ernest D. Buff; Mark J. Holvorson

(57) ABSTRACT

A plurality of Integrated Devices are provided with an Internet connection and a telephone number. The Internet connection has an associated Internet protocol (IP) address permanently or dynamically assigned. It is initiated when one device calls the telephone number of a called device via telephones on a public service telephone network (PSTN). The telephone number has associated telephone connectivity via a telephone line, such that the Integrated Devices can be connected to by dialing the associated telephone number via telephones on the PSTN. An Internet connection is associated with the calling device; the called device is an Integrated Device. An IP address for a first one of the calling or called devices is obtained and provided to the other device, which initiates an Internet connection therewith by sending an Internet message to the IP address thereof. The IP address of the first one of the calling or called devices is obtained by cross-referencing an Integrated Device's telephone number to its IP address when the telephone number of the Integrated Device is known. The Internet is thereby integrated with the PSTN. Significant benefits, including the richness of Internet communications, become available by simply dialing the telephone number of suitably equipped devices or systems.

23 Claims, 5 Drawing Sheets

INTEGRATING THE INTERNET WITH THE PUBLIC SWITCHED TELEPHONE NETWORK

This application claims the benefit of U.S. provisional patent application Ser. No. 60/301,757, filed Jun. 28, 2001.

BACKGROUND OF THE INVENTION

1. Field of the Invention

The present invention relates to the Internet and the Public Switched Telephone Network (PSTN); and more specifically to the integration of the Internet with the PSTN in such manner that systems, services, and devices on either can communicate with systems, services, and devices on the other, whereby the full benefit and unique characteristics of either network become available to these communications.

2. Description of the Prior Art

The Internet and the PSTN constitute discrete, independent networks from an architectural and operational perspective. Much is written about both networks, especially in terms of their architecture and operation. Consequently, the specification provided herein does not reconstruct that information other than providing general background information. The term "Internet" is commonly understood and used throughout the specification and claims in a conventional way. The Internet, in general, is an assemblage of interconnected routers that provide data transport services for server computers and user devices—typically PCs. The interconnection between routers is provided by private line data circuits, the main lines of which constitute the Internet "backbone". Internet Service Providers (ISPs) provide access to the Internet via dial up telephone lines with modems, and via dedicated arrangements such as T–1 circuits, cable modems on cable-TV systems, and DSL (Digital Subscriber Line) service.

The Internet is designed according to the Internet Protocol (IP), which provides detailed specifications for the construction, addressing, and routing of data packets (occasionally referred to as "messages" in this document). (The term "Internet Protocol" also is used loosely to refer to dozens of related protocols that are used in the Internet.) IP addresses are expressed as a series of digits separated by "dots" (periods), in the form XXX.XXX.XXX.XXX where XXX can be a number from 0 to 255. IP addresses provide a similar function on the Internet as telephone numbers provide on the PSTN. A communication with an Internet device can be established by sending a message addressed to the IP address of that device. Every device capable of communicating on the Internet has an IP address assigned to it, either permanently, or dynamically as needed. IP addresses in some environments are replaced with a proxy address; for purposes of this document, the term "IP address" shall refer to an actual IP address, or a proxy or other identifier translatable into an actual IP address. In some arrangements proxies or agents act on behalf of a client system and substitute the proxy's IP addresses for the addresses of the client devices—in these arrangements the combination of the proxy address and the original client system address resolve to provide a unique IP address for each client system. Internet data packets contain the IP address of both the sending system and receiving system (the source and destination, respectively). Since IP messages always contain the IP addresses of both the sending and destination device, when a device receives an Internet message from a sending device, it will then possess the IP address of the sender and can send messages in reply. The two devices can then engage in a communication across the Internet since each has the IP address of the other.

Routers have internal tables that provide routing instructions, which relate IP addresses to the available data circuits and access lines. A router functions by reading the destination address in a data packet, and then forwarding the data packet on one of its data circuits or access lines according to the rules of the routing tables. A data packet gets forwarded from one router to another, pinballing its way across the Internet until it reaches a router that is connected to the destination system.

The term "Public Switched Telephone Network", or PSTN, as used herein means the national and international telephone network, actuated when a user dials a telephone number associated with any other phone, causes it to ring, and if answered, is enabled to carry on a voice communication (or, more properly, a "voice grade" communication) with the person (or system) at the remote location. Just as the Internet is comprised of an aggregation of interconnected routers, the PSTN is comprised of an aggregation of interconnected local and long distance telephone switching systems. The local switching systems, referred to as telephone company (telco) central offices (CO), provide telephone subscriber services in a geographic area.

As used herein, the term "telephone central office switching system" refers generically to a class of systems, typically owned by the operating telephone company in any given area, which provide "local" telephony services to telephone subscribers in that area. Generally, the operating telephone company provides the "local loop" cabling and wiring from its central office to the physical location of each of its subscribers (a "telephone circuit", or a "line"). A telephone central office might house several switching systems of this class, each serving up to 100,000 subscribers or more. The central office represents the hub of a wheel having thousands of spokes, each spoke being a physical pair of wires providing telephone service to a subscriber in that area. Subscribers in any given area are provided service by the central office situated in the center of the area. Outside that area the wires home to other similarly situated central offices. The telephone company connects the telephone circuit of a subscriber to an access connection on the switching system, and assigns a telephone number to that circuit. In operation, the switching system (or just "switch") provides battery voltage on the phone line, sends dial tone to the subscriber line when the subscriber's phone goes off hook, receives the dialed digits, and then routes the call according to its internal instructions based on the called number.

Common manufactured switching systems of this class include the Lucent Technologies 5ESS, and the Nortel DMS 100. All telephone central office-switching systems around the world are interconnected by "trunk" circuits that carry voice or voice grade telephone calls between systems, and most (if not all) such systems are also interconnected by a messaging network referred to as CCS/SS7 (Common Control System/Signaling System 7), or just SS7. Long distance calls to telephones outside of the area served by the local telephone company are typically routed to a long distance carrier, such as AT&T, MCI, or Sprint in the USA. The telephone central office switches connect via trunking and messaging circuits to a class of switching system referred to as a "toll switch", such as the Lucent Technologies 4ESS, operated by a long distance carrier. Toll switches normally do not provide local telephone services.

In the current state of the art there are two inter-related messaging systems utilized within the PSTN. These are: (i)

SS7; and (ii) ISDN (Integrated Services Digital Network), which incorporates a messaging system as an element of a broader product and service architecture. The SS7 messaging system extends through the major elements and systems of the PSTN, connecting virtually all of the local and long distance central offices, and carries call management (or call control) messages relating to call setup and disconnection and similar call management functions. Whereas the SS7 messaging system is oriented toward providing messaging communications among and between the PSTN switching systems, the ISDN messaging system is oriented toward extending the PSTN messaging system to the end devices such as telephones and office telephone systems. Rather than going off hook and drawing dial tone from the local central office switching system to initiate a call, as analog phones do, an ISDN phone sends a packetized digital call setup message to the switching system to initiate a call. Both the ISDN messaging system and the SS7 messaging system are based on the X.25/X.75 communications protocols. ISDN messages are carried on the SS7 messaging network. Disadvantageously, neither the SS7 nor the ISDN messaging systems carry any messages related to creating an Internet communication by one device dialing the telephone number of another.

The ISDN and SS7 messaging systems are call setup and call management (or call control) systems which carry a spectrum of messages, message responses, message acknowledgements, and the like, such as are necessary to conduct telecommunications. A full listing of all the message types that might be employed in a robust telecommunications environment has not been attempted herein, since that depth of information is not necessary to convey the essential elements of this invention. A brief listing of those message types include: (i) call setup request messages which convey dialing and associated information; (ii) busy signal messages telling the calling device to deliver a busy signal to the user; (iii) audible ring back messages telling the calling device to deliver "pacifier" ringing to the user; (iv) call request acceptance or rejection messages (v) call connect messages; (vi) call disconnect messages; (vii) switchhook flash messages; (viii) call transfer request messages; (ix) call conference messages; (x) call waiting messages; (xi) Caller-ID and Call Waiting-ID messages; and (xii) call forwarding messages to redirect a call to another device. In addition to these messages, a variety of other messages would be employed to indicate information like "network busy", "invalid telephone number dialed", and the like.

Conventional communication vehicles comprise computers and telephones. Computers typically have telephone lines attached to them, and telephones oftentimes have computers attached to them; but there is no true integration that enables the blending of the Internet and the PSTN. The level of integration that is presently attained permits a computer to use a phone line to dial into the Internet. Once on the Internet, the computer can access another computer by entering its Internet Protocol (IP) address into application software such as a browser.

In an associated matter, there are now a variety of technologies that provide both Internet and PSTN connectivity. These technologies include: (i) Voice over IP (ii) DSL service; (iii) cable modem service delivered by cable-TV systems; (iv) fixed wireless systems; and (v) Internet capable cellular wireless systems.

In one aspect, the systems described herein relate to Voice over IP service. The term IP refers to the "Internet Protocol", the basic protocol of the Internet, while the term Voice over IP refers to sending digitized voice across the Internet using the IP protocol. Several companies provide discount rate phone calls using "Voice over IP" (VoIP) technology, wherein a long distance call of a client, typically a Personal Computer (PC) user, is carried over the Internet to a VoIP interface device in the vicinity of the called party. Such VoIP technology avoids the charges associated with placing a long distance call with a traditional long distance carrier. The VoIP interface device dials a local call on the PSTN to complete the connection for the VoIP client. Hence, the call travels partially over the Internet and partially over the PSTN as an analog call. A VoIP software application at the client device digitizes the user's voice and sends that as data messages across the Internet to the VoIP interface device. The VoIP interface device in turn converts the data messages to analog signals that are output onto the analog phone line. In the reverse direction, the VoIP interface device receives analog signals from the dialed phone and converts those analog signals to digital messages, which it sends across the Internet to the VoIP client. The VoIP software at the client converts those digital messages to analog signals, which are output to the user via speakers.

As background information, there are a group of standards and draft standards from the ITU (International Telecommunications Union) and the IETF (Internet Engineering Task Force) relating to Internet telephony. These standards include H.323, H.245, and T.120, and collectively define how Internet phones should work, including such matters as call connection, determining the capabilities of the receiving phone, conferencing, transferring files and images, enabling shared whiteboards, audio and video codecs, supported transport protocols, etc. These standards do not specify arrangements for integrating the Internet with the PSTN as are provided for by the inventions of this patent application.

In another aspect, the systems described herein relate to an Internet access technology currently being deployed that is referred to as DSL (Digital Subscriber Line) service. (The original acronym was ADSL, for Asynchronous Digital Subscriber Line.) Although there are some variations on the technology (now generically referred to as "xDSL"), it essentially involves an analog telephone line supplemented by a high frequency carrier signal superimposed on the telephone line by a pair of modems—one at the subscriber location, and one at the telephone company central office. The DSL carrier signal can carry high-speed data concurrently over the same phone line without interfering with the analog phone service. Other than being carried by the same physical wires, the phone line has no relationship to the DSL Internet service.

In another instance, the matter to be discussed relates to virtual phone service provided via cable TV. Cable TV service has been used to provide high-speed Internet access—the popular "cable modem" service. In addition, there are a number of current activities related to delivering alternative provider telephone service via the cable TV distribution system. Similar to the Internet access service arrangement, the telephony service arrangement utilizes a "cable modem" to transmit and receive voice grade telephone calls. Other than being carried by the same physical cable, telephone service provided by cable TV has no relationship to the cable modem Internet service.

A related matter is that of virtual phone service provided by the so-called fixed wireless arrangement, currently undergoing field trials in some areas, and by the newly introduced cellular telephone service with Internet access. Although these are substantially different services from a user perspective, the wireless infrastructure is much the same.

In each of these technologies, even though they provide both Internet and PSTN connectivity, the Internet aspect is separated from the telephony aspect. Furthermore, none of these technologies enables one device to create an Internet communication with another device simply by dialing its telephone number.

Although they are discrete, independent networks, the Internet and the PSTN touch each other at the edges, in two fashions.

A.) Referring to FIG. 1, most computer users access the Internet 10 using a phone line 16, modem 17, and phone 18 connected to their Personal Computer (PC) 20 by dialing into a phone number provided by an Internet Service Provider (ISP). The phone lines 21 for these numbers are connected to devices called Terminal Servers 22, which incorporate compatible modems and concentrate the circuitry for multiple phone lines and modems. The Terminal Server has a high-speed digital connection 24 to the Internet, commonly in the form of a T-1 circuit, which is shared by all dial-in users (the concentrator function). The Terminal Servers are typically located in a telephone company central office 12, but owned by an ISP. The main component of the telephone company (telco) central office (C.O.) is a telephone switching system 14. The C.O.'s are connected together via communications links 26, and the aggregate of C.O.'s, switching systems, and interconnection links collectively constitutes the PSTN 28.

ISP's are in the business of providing Internet connectivity to subscribers of their service for a monthly fee or similar type of reimbursement (some ISP's use an advertising supported scheme, nevertheless, they are compensated for their service). Once a subscriber such as that shown as computer A dials in to and establishes a connection with ISPI at the Terminal Server 22, a logical connection is created using the Internet protocols which allows the user to communicate with available systems on the Internet. Such a communication is initiated by the user sending a data message to the IP address of another system on the Internet.

B.) Several companies are in the business of providing discount rate phone calls using a technology called "Voice over IP" (VoIP), in which a long distance call is carried over the Internet to a drop off point in the vicinity of the called party. At the drop-off point there is a Terminal Server 22 type of device, working in reverse, such as that shown in FIG. 1 for Voice over IP carrier 1 (VoIP1). As before, this device has a high speed shared connection to the Internet 24, and has multiple local telephone lines 21 connected to it. Since the purpose of this device is to allow Internet users to make voice telephone calls, it would not normally have modems connected to the local telephone lines 21. Operationally, multiple, concurrent voice sessions are carried digitally over access connection 24 (multiplexed), and are distributed or demultiplexed to individual telephone lines 21. To distinguish this type of device from a standard Terminal Server, we will refer to it as a Voice over IP distribution device.

The Voice over IP carrier provides each of its users with a software application (not shown) that enables the computer user to enter a number to be dialed. The computer user A, having created an Internet connection as described previously, dials a phone number by using the VoIP software application. That software application, perhaps operating in conjunction with other systems of the VoIP carrier, creates a logical connection across the Internet to a remote VoIP distribution device such as that labeled VoIP1. Upon receiving a request from a user to create a telephone connection, the VoIP distribution device takes a local phone line 21 off hook and dials the number input by user A. When the remote party answers, perhaps someone at the phone labeled B, a voice connection (or "voice grade" connection) is established. The business proposition for VoIP is that ISP's charge either a flat rate or an hourly rate for usage, but once a user's data gets on the Internet, it can go anywhere in the world for no additional fee. The ISP's fee is small compared to the per-minute charges of telephone companies, and there is no charge equivalent to the telephone companies' long distance charge. Since the long distance component is free, and the monthly ISP subscription fee has already been paid by the subscriber, the VoIP carrier only has to bill enough to recover the costs of providing the VoIP distribution devices and local phone lines.

What is not provided by either of these two arrangements is a mechanism by which a user either on or off the Internet can dial a phone number and, if the device associated with that phone number has Internet connectivity, communicate with that device via the Internet. If such an arrangement were possible, then those two devices could communicate with all the richness that the Internet has become known for, by simply by dialing a phone call. Because of the voids in current technology, there remains a need in the art for a method and means to integrate the Internet with the PSTN.

SUMMARY OF THE INVENTION

The present invention provides a method and means for integrating the Internet with the PSTN such that an Internet communication can be created by one device calling the telephone number of another. In accordance with the invention, devices for integrating the Internet with the PSTN ("Integrated Devices") have an Internet connection with an associated IP address, and have a telephone connection with an associated telephone number. The telephone connection to the PSTN could be a virtual telephone line, such as that being provided over cable-TV systems.

In order to conduct an Internet conversation between two devices, each device must have an IP address. This invention provides for a means to obtain the IP address of at least one of the calling and called devices and to provide that IP address to the other, such that one of the two devices can initiate a communication to the other over the Internet. The Internet Protocol incorporates the IP address of the sender and the receiver in every message. When one device initiates an Internet communication to the other, the receiver automatically learns the IP address of the sender and a two-way communication can commence.

There are a variety of ways to obtain the IP address of a calling or called device. In each such arrangement, there are provided telephone number cross-references which contain the IP address associated with the telephone number of an Integrated Device. In simple terms, Internet devices or telephone devices wishing to communicate with an Integrated Device known by a telephone number can determine if that telephone number has an IP address associated with it by looking it up in a cross-reference, or by having an agent such as a telephone central office perform that lookup. Cross-references of IP addresses to telephone numbers could be maintained in the Internet, in the PSTN, in the device, or in any combination of the three.

Once an IP address has been obtained for a calling or called device it must be delivered to the other device. This invention also provides a means for delivering the IP address of one device to the other. In general terms, this requires an addressable digital messaging arrangement such that digital messages can be sent to one or the other of the two devices. The Internet, of course, satisfies this requirement and is suitable in some scenarios, such as that illustrated in FIGS.

2, 3, and 5. However, there also are other available technologies suitable for sending addressable digital messages in a telecommunications environment, such as the messaging component of ISDN service (Integrated Services Digital Network). This aspect of the invention inherently requires that the sender know the digital address of the device to which the message will be sent. In some scenarios, that address will be an IP address, perhaps discovered from a cross-reference. In other scenarios, such as an ISDN environment, that address is automatically tied to the telephone number, so one device only needs to know the telephone number of the other to send it an ISDN message. In yet other scenarios, the telco switching system will know that address from subscriber records.

The Internet already maintains a cross-reference system, referred to as the Domain Name Service (DNS), which allows an Internet "site" or "location" to be publicly known by an alphanumeric name, such as Sears.com or Toyota.com, rather than by the strictly numerical IP address. (A master registry is maintained by the InterNIC organization, and is copied daily to thousands of DNS servers around the world.) This DNS service could be expanded to also maintain telephone numbers for these Internet locations. In addition, the cross-reference of IP addresses to telephone numbers could be indirect via the use of names by looking up a telephone number (TN) to find a name, then looking up the name to find the IP address. In the more straightforward version of this arrangement, if an Internet device wished to communicate via the Internet to a device known by a telephone number, it could query an appropriate DNS server for the telephone number. If the called device is listed in the DNS server as having an IP address, the calling device will receive that information back from the query. The calling device may then communicate with the called device via the Internet.

In another cross-reference version, the Integrated Devices themselves could provide the cross-reference of telephone number to IP address by a device knowing its own TN and IP numbers. The calling and called devices could exchange this information using available techniques such as the messaging system incorporated into ISDN.

The PSTN could also maintain a cross-reference of telephone numbers having associated IP addresses. Thus, if a device, having an IP address, called a second device, also having an IP address, and the PSTN maintained a cross-reference of these numbers, then the PSTN could notify the caller of the called device's IP address via some appropriate means (or optionally, notify the called device of the caller's IP address). The caller could then communicate directly with the called device via the Internet. In the discussions of the PSTN, it should be understood that the PSTN is no more a monolithic whole than is the Internet. It is comprised of very many telephone companies and authorities, and each might have very many switching centers (telephone company Central Offices). Therefore, in an arrangement in which "the PSTN" maintains a cross-reference between phone numbers and IP addresses, it would be reasonably understood that an authority, company, regional district, or Central Office might maintain such a cross-reference for local subscribers, and depend on other authorities, companies, regional districts, or Central Offices to maintain the same information for their own local subscribers.

There are several possible ways for the PSTN to notify the calling device of the remote device's IP address. The worldwide PSTN has a messaging system interconnecting all the major switching centers (known as Call Control System/Switching System 7, or CCS/SS7, or just SS7). It would be reasonable to anticipate that telephone companies might use SS7 for this purpose by forwarding an IP/phone number query to the serving agency of the called device via SS7, and receiving the query response and IP address by SS7. As another possibility, the PSTN might use an existing messaging technology such as the digital messaging capability incorporated into the Integrated Services Digital Network (ISDN), or Analog Display Screen Interface (ADSI). As still another possibility, the PSTN might have Internet access in order to communicate with the calling device via an Internet message. Since multiple workable arrangements are possible, we only need to specify that if the PSTN maintains an IP/telephone number cross reference, it must have a method of sending appropriate messages to one or the other or both of the calling and called devices.

In any of the above cross-referencing arrangements, the resulting "communication" between the devices could be entirely over the Internet (voice, screens, images, etc.), or part of the communication could transpire over the Internet (the screens and images, for example), and part could transpire over the PSTN (the voice communication, for example).

Using the inventions and arrangements outlined herein, a suitably equipped telephone user or Internet user wishing to communicate with a suitably equipped device known by its telephone number could create an Internet communication with that device. Moreover, an individual Integrated Device telephone could be reached either via the PSTN by dialing the phone number, or via the Internet by using an Internet addressing scheme. The phone number can be dialed from any phone or Integrated Device on the PSTN, or from any VoIP enabled device on the Internet.

BRIEF DESCRIPTION OF THE DRAWINGS

The invention will be more fully understood when reference is had to the following detailed description of the preferred embodiment of the invention and the accompanying drawings, in which.

DETAILED DESCRIPTION OF THE INVENTION

Figure 1:
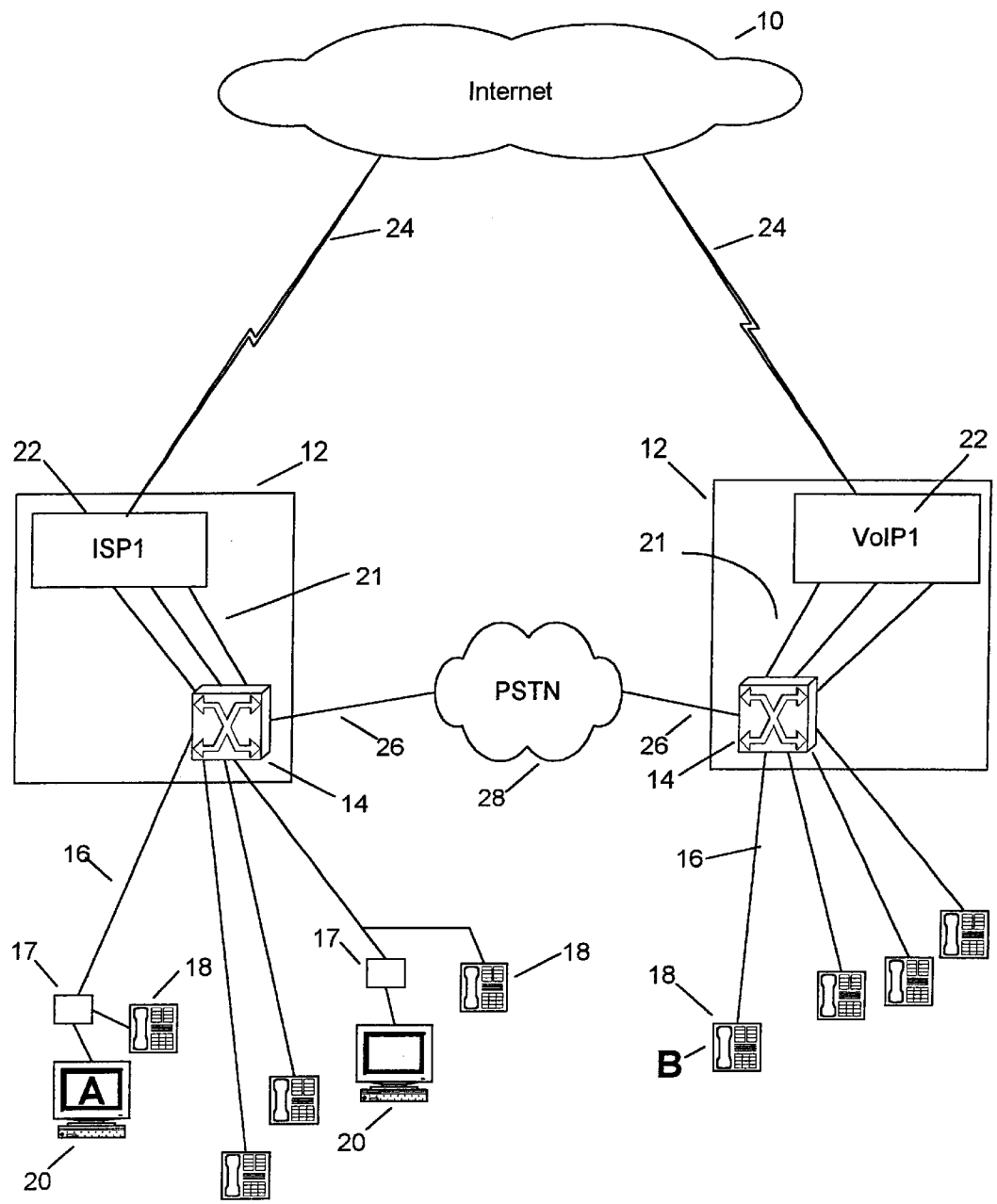
FIG. 1 is a schematic diagram of a Terminal Server providing access to the Internet for ISP subscribers, and providing VoIP Internet-to-PSTN telephone calls in the current state of the art.

Central to the principles and practice of this invention, as well as the inventions described by the co-pending patent applications, is the presence of means for enabling a calling device to create an Internet communication with another device simply by dialing its telephone number, thus integrating the Internet with the PSTN. The co-pending patent applications describe various aspects of this integration. One benefit of such integration is that traditional voice-only telephone calls can be augmented or replaced with multimedia communications using Internet protocols and capabilities. Such multimedia communications may include: voice and other audio; graphics, images and other visual material; motion video; and synchronized audio and video transmitted together including TV video and videophone service. The data for these multimedia communications may be transmitted on the Internet as a result of the integration described herein. The enhanced capabilities provided by the present invention facilitate that integration.

The following provides an overview of the co-pending patent applications.

Co-pending patent application entitled "Integrated Device For Integrating The Internet With The Public Switched Telephone Network", Ser. No. 60/301,756, describes "Integrated Devices" for integrating the Internet with the PSTN, which have an Internet connection with an associated IP address, a PSTN connection with an associated telephone number, and a digital messaging connection to the PSTN for conveying call management messages to include messages containing telephone numbers and IP addresses.

There exists a class of devices, such as those for Voice over IP, DSL, cable TV, fixed wireless, Internet capable wireless cellular, and similar distribution systems, which provide Internet and telephony services to client devices, such as phones and PCs, by providing an interface to the telephone company central office switching system. Co-pending application entitled "Telephone Central Office Switch Interface With Messaging Channel For Integrating The PSTN With The Internet", Ser. No. 60/301,758, discloses a method and means for providing specific messaging capabilities between a telephone central office switching system and this class of interface device, enabling the integration of the Internet with the PSTN. The communications link carries call setup, telephone number, and IP address messages to and from the switching system and to and from the client devices of the interface device.

Co-pending patent application entitled "Telephone Switching System For Integrating The Internet With The Public Switched Telephone Network", Ser. No. 60/306,294, discloses a method and means for a telephone central office switching system to enable a calling device to establish an Internet communication with a called device by dialing its telephone number.

Co-pending patent application entitled "Integrated Telephone Central Office Systems For Integrating The Internet With The Public Switched Telephone Network", Ser. No. 60/306,293, discloses an integrated assembly of telephone central office switching system integrated interface devices, comprising telephone central office switching systems, and switching system interface devices such as those for providing DSL service, Voice over IP (VOIP) service, cable modem service, fixed wireless service, and Internet capable cellular wireless service. The integrated telephone central office systems therein described offers efficiencies and economies further benefiting the integration of the Internet with the PSTN.

A messaging system such as that specified in the co-pending patent application entitled "Call Management Messaging System For Integrating The Internet With The Public Switched Telephone Network", Ser. No. 60/311,401, exchanges call management messages such as call setup requests, call disconnect messages, Call Forwarding messages, and so on, between communications systems and user devices, either being connected to the Internet, the PSTN, or to both.

Co-pending patent application entitled "Interactive Device Control System For Integrating The Internet With The Public Switched Telephone Network", Ser. No. 60/317,055, discloses a system for the PSTN and the Internet in which a communications system offers the user of a device such as a screen phone the ability to control or influence functions of the communications system by presenting the user with a displayed menu of options. The menu of options is sent to the user's device by the communications system via a messaging system. Selection of an option by the user returns a response message to the communications system via the messaging system. Upon receipt of the response message, the communications system actuates the function associated with the user-selected option. The interactive device control system operates seamlessly across both the Internet and the PSTN, thus providing further integration of those two networks.

Co-pending patent application entitled "Stored Profile System For Storing And Exchanging User And System Communications Profiles To Integrate The Internet With The Public Switched Telephone Network", Ser. No. 60/317,057, discloses a system for the PSTN and the Internet to maintain and exchange communications related information such as hardware capabilities and personal information and preferences. The Stored Profile System enables devices to synchronize and optimize their communications capabilities, and enables users to exchange contact information such as Electronic Business Cards as a part of call setup, operating like an enhanced Caller-ID. The stored profiles capability extends to communications systems on both the PSTN and the Internet, thus further promoting the integration of the Internet with the PSTN.

Central to the principles and practice of this invention, as well as the inventions described by the co-pending patent applications, is the presence of means for enabling a calling device to create an Internet communication with another device simply by dialing its telephone number, thus integrating the Internet with the PSTN. The co-pending applications describe an environment in which the various elements of the PSTN are enabled to conduct digital, packetized messages, which communicate essential information between various devices across the Internet and the PSTN to provide for this integration. Although not limited to the scope of the following listing, these enabled PSTN elements include: (i) the end or terminal devices such as telephones, wireless handsets, and Integrated Devices; (ii) telephone central office switching system interface devices, such as those for VoIP, DSL, cable-TV, fixed wireless and cellular wireless, and the like, which provide telephony and Internet services for client devices; (iii) telephone central office switching systems which provide telephony services for client devices; (iv) telephone long distance switching systems which provide long distance capabilities on the PSTN; (v) office telephone systems such as PBXs, Key Systems and the like; and, (vi) adjunct devices such as automated attendant systems, automatic call distributors, voice mail systems, and the like.

Some of these devices, including the end or terminal devices, are uniquely addressable within the messaging system via an IP address, telephone number, or other identifier associated with the device. Other identifiers could include an internal system reference (e.g., module, cabinet, shelf, slot, port number), an ISDN (Integrated Services Digital Network) address, or the like. Regardless of the nature of the address, Integrated Devices have messaging addresses known to the serving system such as a telephone central office switching system, telephone central office switching system interface device, office telephone system, and the like, such that the serving system can communicate with the Integrated Devices via the messaging system.

The messaging system common to this invention and the inventions of the co-pending patent applications connects between each of these devices and systems, and the messages of which the messaging system is comprised are transmitted to and between each of these devices as are necessary for any individual communication. Some devices and systems may simply act as a pass-through for the message stream by passively or actively forwarding messages, or may act as a pass-through for specific message types while acting upon others. Each device or system may send, receive, forward, or act upon any given message as is necessary to accomplish the message functions. Messages may be sent in one or more pieces from one device to the next, and devices may assemble, reformat, re-packetize, augment a message with additional data, or otherwise manipulate a message as is processed through the system.

The co-pending applications described hereinabove provide reference information useful in developing a full understanding of the present invention as it relates to these systems and devices. Accordingly, the disclosure of each aforementioned co-pending application is incorporated herein by specific reference thereto.

Certain enhancements over the co-pending patent applications are herein described.

Referring to FIGS. 2 through 5 of the drawings, there is provided a detailed description of the invention.

Figure 2:
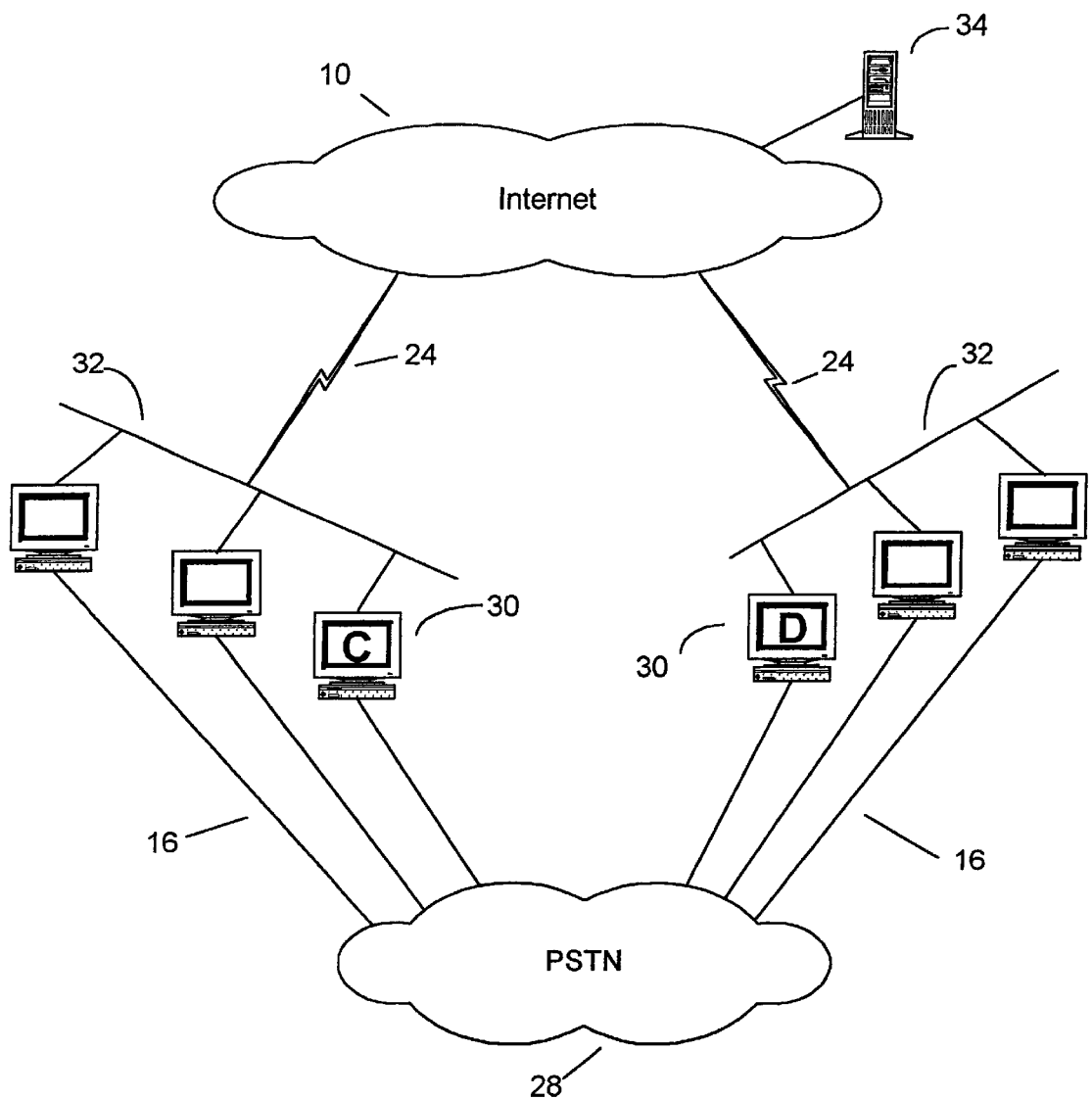
FIG. 2 is a schematic diagram of Integrated Devices on the Internet and the PSTN, showing a DNS method of maintaining a cross-reference of TN to IP.

This invention provides for the capability of DNS servers to maintain a cross-reference of TN to IP for Integrated Devices, and for a device wishing to establish an Internet communication to an Integrated Device being able to query the DNS cross-reference by the telephone number of the Integrated Device to retrieve its IP address. Once having the IP address, the initiating device, which also can be an Integrated Device, can send an appropriate message to the Integrated Device to establish an Internet communication between them. FIG. 2 shows the Internet 10, the PSTN 28, a series of Integrated Device workstations 30, one of which is labeled C and one labeled D, connected to phone lines 16 and to Local Area Networks (LANs) 32. The LANs have access lines 24 connecting to the Internet. Shown throughout these drawings, access lines 24 represent a suitable connection to the Internet such as that provided by a T-1 circuit. Similarly, other components such as phone lines 16 and LANs 32 are intended to represent a generic class of objects. The Internet has a DNS server 34. The DNS server, which normally maintains a cross-reference of Internet names to IP addresses, is also provided with a cross-reference to telephone numbers for Integrated Devices.

A description of the manner wherein this arrangement functions operationally is set forth hereinafter with reference to the following example. Assume that the Integrated Device workstation labeled C wishes to call the Integrated Device workstation labeled D. Also assume that workstation C has a telephone software application that can dial phone calls on the associated telephone line 16, and that can also create an Internet communication to a called Integrated Device. The user at C enters the telephone number (TN) for D into the telephone software application of workstation 30 in an appropriate fashion (perhaps by typing the numbers on a computer keyboard). The telephone application will determine if the called TN is associated with an Integrated Device and is therefore available to create an Internet communication; it will make this determination by performing a DNS query on the dialed TN of workstation D to ascertain whether or not workstation D has an IP address associated with its telephone number. Assume that the workstation C has encoded into it the Internet address of the DNS server 34, as is customary. Workstation C creates a DNS query message containing the TN of D and sends it by appropriate addressing to the DNS server 34. Assume for this example that workstation D is an Integrated Device, therefore possessing an IP address associated with its telephone number. The DNS server 34 looks up the TN in the cross-reference, finds the associated IP address of D, and sends a response message to C containing the IP address for D. The telephone software application of workstation C then creates and sends an Internet message to D, addressed to D's IP address, requesting an Internet connection. If workstation D responds favorably, an Internet communication commences. If, on the other hand, called workstation D were not an Integrated Device, and therefore not possessing an IP address associated with its telephone number, DNS server 34 would return a negative response to the query message from workstation C. The telephone software application of workstation C would then seize the associated telephone line 16 and dial a standard telephone call to workstation D.

Enhancing the operation just described, the DNS server could be arranged to facilitate the integration of the Internet and the PSTN such that, by receiving an appropriate DNS query message from Workstation C containing the TN of Workstation D, the DNS server obtains the IP address of Workstation D. Now having the IP addresses of C and D, the DNS server then sends an appropriate message to Workstation D informing Workstation D of the query by C and C's IP address. Workstation D then creates and sends an Internet message to C, addressed to C's IP address, thus completing an Internet connection between the two devices.

Figure 3:
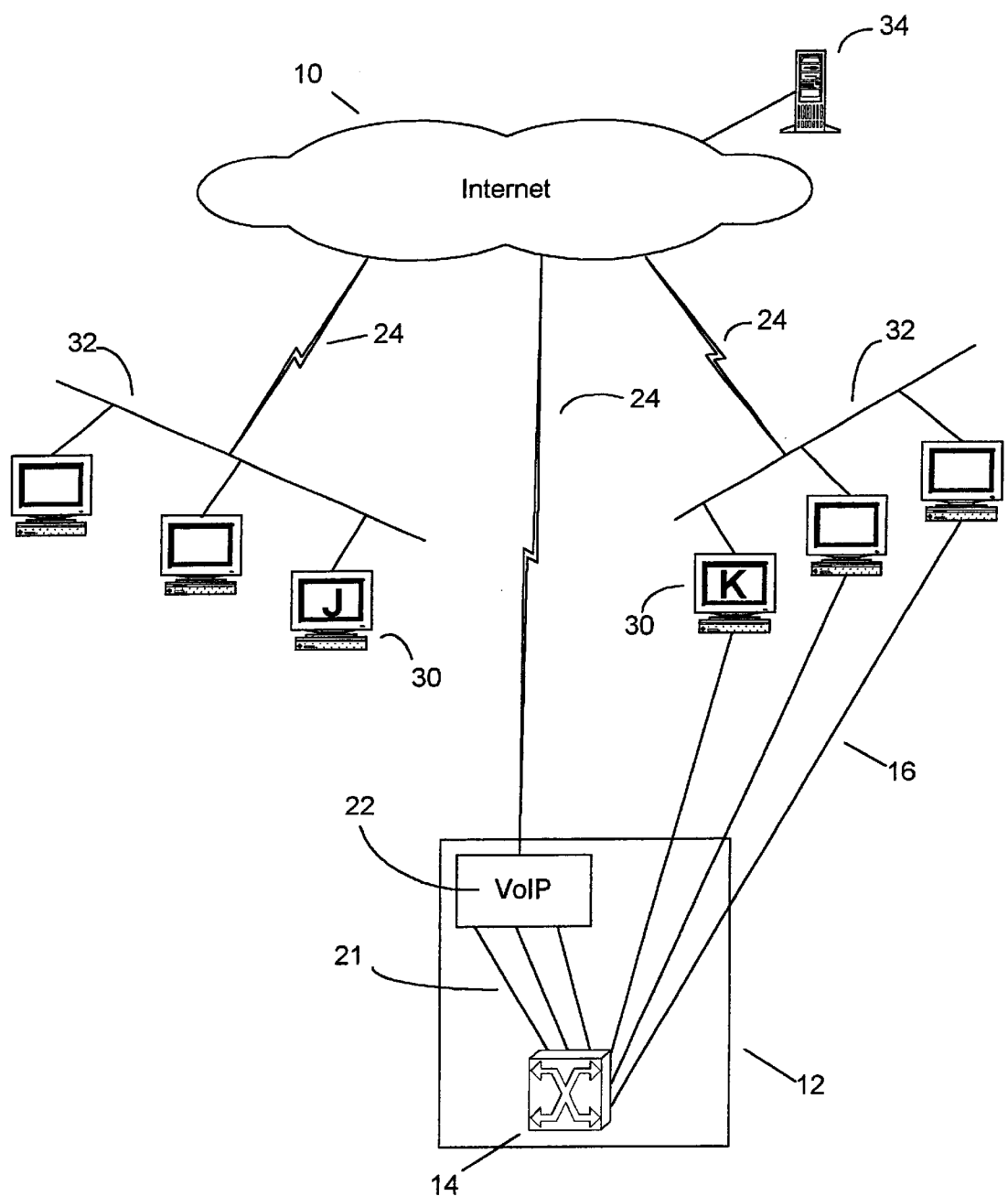
FIG. 3 is a schematic diagram showing a DNS cross-reference in a VoIP environment.

FIG. 3 illustrates a variation of the DNS server cross-reference arrangement in a VoIP environment in which the calling device has Internet connectivity but has neither PSTN connectivity nor a telephone number. Referring now to FIG. 3, there is an arrangement with workstations 30 on the left side of the drawing, one being labeled J, residing on a LAN 32 having access line 24 to the Internet, and a similar arrangement on the right side of the drawing with workstations 30, one being labeled K, having telephone lines 16, these workstations residing on another LAN 32 which also has access line 24 to the Internet. As in FIG. 2, the Internet is shown as 10 and a DNS server as 34. Telephone central office 12 includes switching system 14 which provides telephone lines 16 and also provides telephone lines 21 to VoIP interface device 22. VoIP interface device 22 has access line 24 to the Internet.

To describe the operation of this arrangement, assume that workstation J, having only an Internet connection, wishes to place a VoIP telephone call to workstation K. In the prior art method of operation, the user of J would enter the telephone number of K into a VoIP software application. That application, working in conjunction with the facilities of the VoIP vendor, sends a call setup request message, containing the called TN, via the Internet to VoIP interface device 22. VoIP interface device 22 would then seize a telephone line 21 and dial the telephone number of workstation K. If K answers the call, an end-to-end connection, extending partly over the Internet and partly over the PSTN, is maintained by VoIP 22.

In the method of operation of this invention, when VoIP interface device 22 receives the call setup request message from J it sends a DNS query message containing the called TN to DNS server 34. Assume for this example that workstation K is an Integrated Device, therefore possessing an IP address associated with its telephone number. The DNS server 34 looks up the TN in the cross-reference, finds the associated IP address of K, and sends a response message to VoIP interface device 22 containing the IP address for K. VoIP interface device 22 sends a message containing the IP address of K to calling workstation J notifying J that an Internet communication can be created with K. The telephone software application of workstation J then creates and sends an Internet message to K, addressed to K's IP address, requesting an Internet connection. If workstation K responds favorably, an Internet communication commences. If, on the other hand, called workstation K were not an Integrated Device, and therefore not possessing an IP address associated with its telephone number, DNS server 34 would return a negative response to the query message from VoIP interface device 22. VoIP interface device 22 would then process the call in the prior art method of operation by seizing a telephone line 21 and dialing a standard telephone call to workstation K.

Another variation in which the DNS server maintains a cross-reference of TN to IP address enables an Internet device to create a telephone call to a device known by its IP address or name. As an example of this variation, assume that Workstation D of FIG. 2 is the web site for PC Connection, a catalog company selling computer products. PC Connection sells products over the Internet, by mail order, and by telephone order. Assume that Workstation C has a VoIP application that can accept the input of either TN's or names. If the user at Workstation C wishes to call PC Connection, they may enter the PC Connection web site address into the VoIP application. The application queries a DNS server to obtain the TN of PC Connection. The application then causes the workstation to originate a telephone call to PC Connection's TN.

Figure 4:
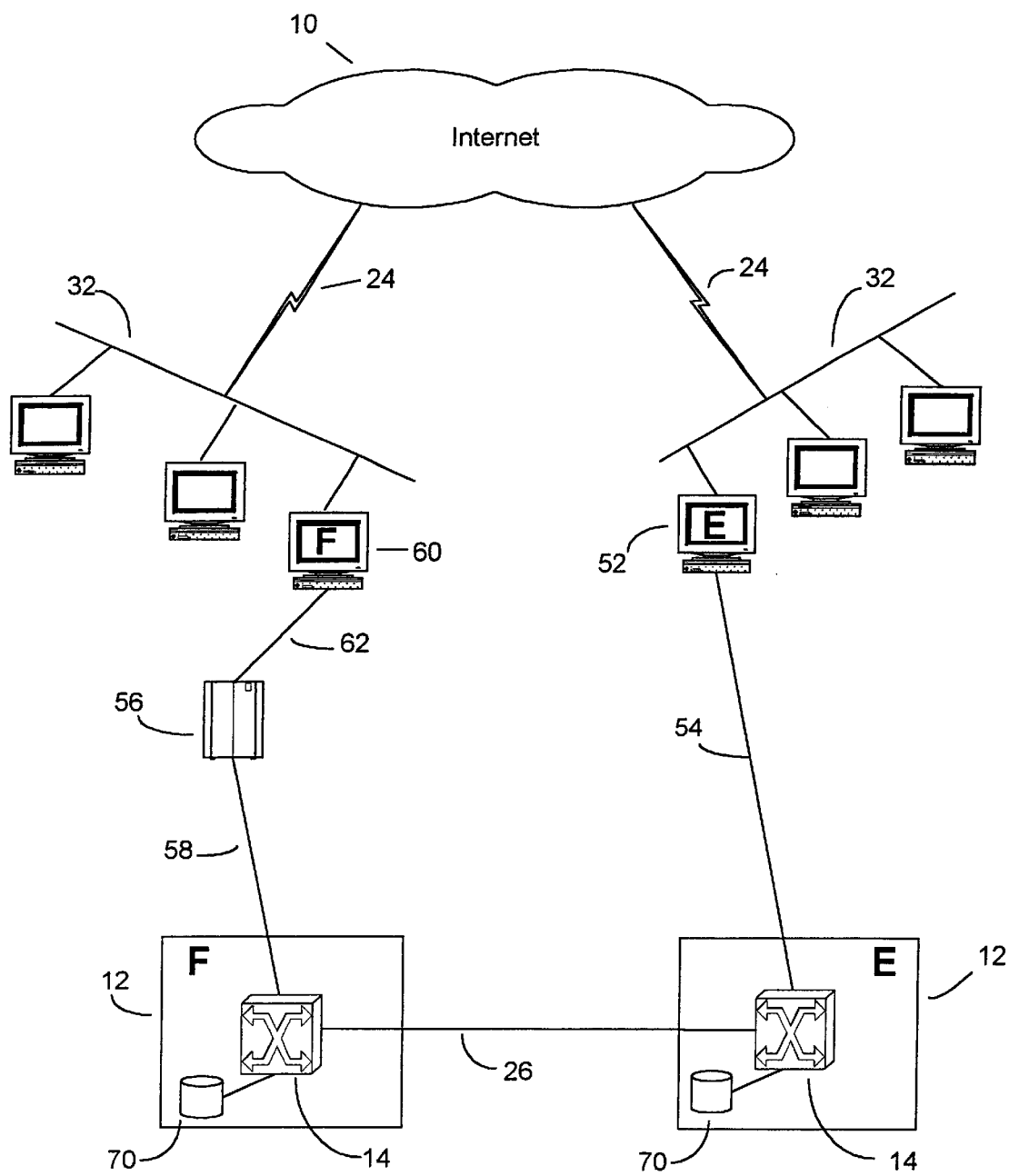
FIG. 4 is a schematic diagram illustrating an Integrated Device that maintains its own cross-reference of TN to IP and provides the IP address to the called Integrated Device.

In another embodiment, the Integrated Devices maintain their own cross-reference information and provide that cross-reference information to another Integrated Device via the PSTN in such a fashion as to enable an Internet communication between the two devices by one dialing the TN of the other. Referring now to FIG. 4, the Internet is shown as 10, and the PSTN is shown by two of its component C.O.'s 12, telephone switching systems 14, and interconnecting circuits 26 between them. Integrated Device workstation E shown as 52 is connected to a C.O. switch 14 by an ISDN BRI (Basic Rate Interface) connection 54. Integrated Device workstation E maintains its own TN to IP cross-reference (not shown). Workstation E is also connected on a LAN 32 having an access line 24 to the Internet. ISDN PBX (Private Branch Exchange) 56 is connected to a C.O. switch 14 by an ISDN PRI (Primary Rate Interface) circuit 58, and has an Integrated Device workstation F shown as 60 connected to it via an ISDN BRI connection 62. Integrated Device workstation F maintains its own TN to IP cross-reference (not shown). Workstation F is also connected to a LAN 32 having an access line 24 to the Internet. ISDN is a message oriented digital service comprised of both the capability of sending digital messages between devices and systems, and a suite of protocols to convey a structured set of information. For example, instead of sending tones for dialed digits to the C.O., an ISDN device sends a call setup request message to the C.O. containing the desired TN. If the call extends to another C.O., the local C.O. forwards the call setup message on to the remote C.O., and so on. Similarly, messages can extend through a PBX to its extension phones (in our case, an Integrated Device workstation). One aspect of the ISDN messaging system is the ability to send messages between end devices on a call.

By way of example to demonstrate the operation of this arrangement, presume that Integrated Device workstation F places a call to Integrated Device workstation E. Workstation F sends its IP address to E using an ISDN messaging capability. The ISDN messages travel across ISDN PRI access line 58, across the multiplexed communications link 26 between telco switching systems 14, and across the ISDN BRI link 54 to workstation E. Workstation E responds by sending an appropriate message via the Internet to workstation F's IP address. Assuming that both devices agree to create the desired connection, an Internet connection is established and communication commences over the Internet. Optionally, workstation E could send its IP address to workstation F, with the remainder of the process working in reverse. A key point of this example is that the workstations function as elements of the PSTN in providing the IP address of one to the other via a PSTN digital messaging capability. Another point to highlight is that there could be surrogate systems, services, or devices that perform the cross-reference function as an agent or proxy on behalf of an individual device. For example, the ISDN PBX might maintain a cross-reference system for all of its Integrated Device workstations. Similarly, a server on a LAN might provide that service for all the Integrated Device workstations on a LAN.

Figure 5:
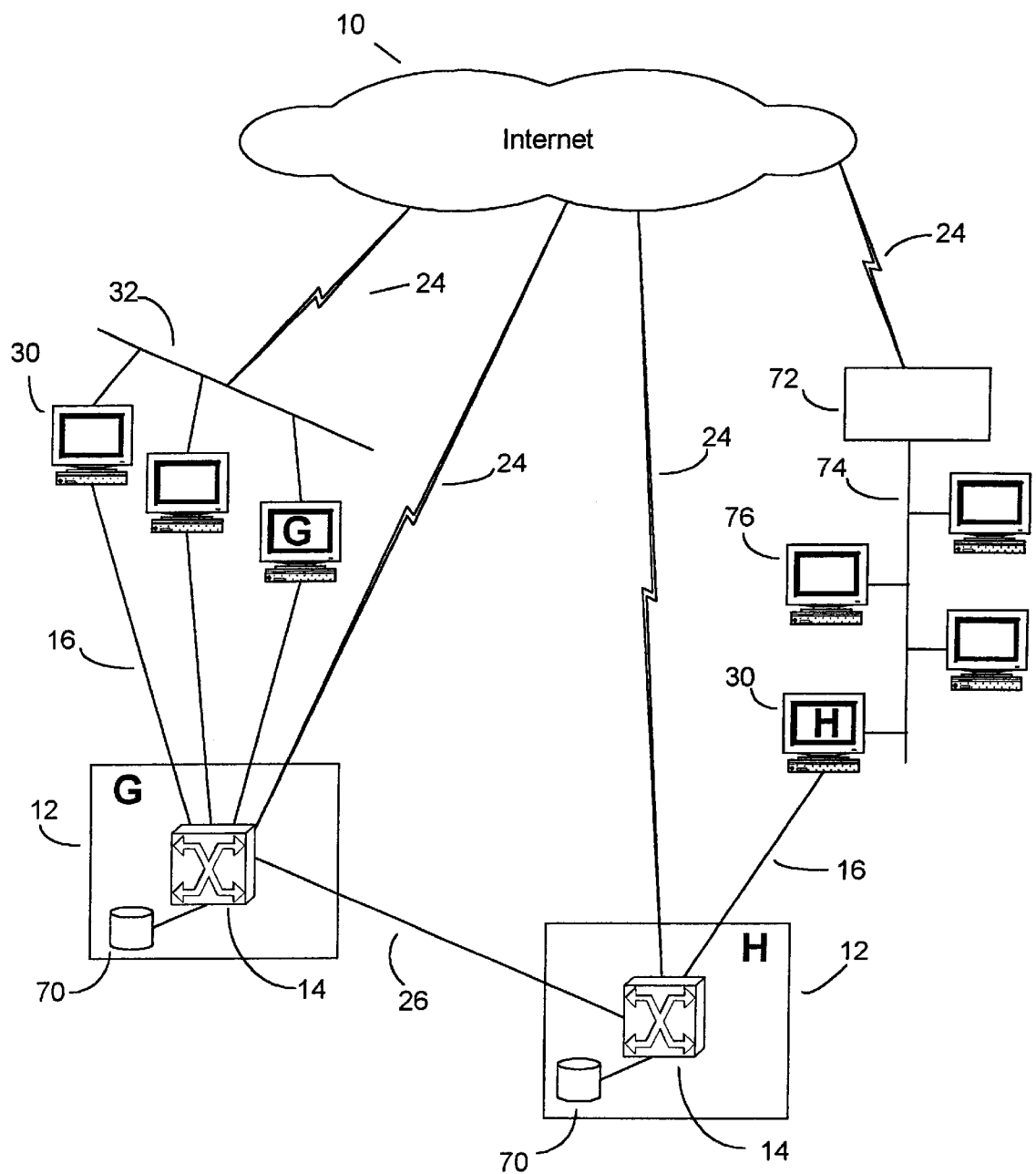
FIG. 5 is a schematic diagram depicting a preferred embodiment in which the PSTN maintains the cross-reference of TN to IP and provides the IP address to the calling Integrated Device.

In the preferred embodiment, the PSTN maintains the cross-reference. FIGS. 4 and 5 describe two variations of the preferred embodiment of this invention in which telco central offices maintain the TN to IP cross-reference for their subscribers, exchange that information with other telco central offices in the process of call setup, and notify one or the other or both Integrated Devices of the IP address of the other in order to facilitate an Internet communication between them.

One variation in which the central office maintains the cross-reference can be described by again referring to FIG. 4 wherein the central office 12 and switching system 14 providing service to ISDN workstation E has associated with it database 70 containing a cross-reference of TNs to IP addresses for its client devices. By way of example to demonstrate the operation of this arrangement, assume that Integrated Device workstation F places a call to Integrated Device workstation E. Workstation F sends a call setup request message to its serving central office 12, which forwards the call setup request message via multiplexed communications link 26 to the central office labeled E which serves workstation E. Central office E receives the call setup request message and looks up the IP address for workstation E in database 70 based on workstation E's telephone number. Central office E then, via the same messaging pathways, returns a message to workstation F containing the IP address of workstation E. Workstation F may then initiate an Internet communication with workstation E by sending an appropriate message to workstation E via the Internet. Optionally, central office F could look up the IP address for workstation F and forward the IP address along with the call setup request message to C.O. E and workstation E. Workstation E then having the IP address of workstation F could initiate an Internet communication with workstation F.

FIG. 5 shows an environment in which the Integrated Devices have analog phone connections and in which the telephone central offices use the Internet as a messaging medium to communicate IP address information to those Integrated Devices. In FIG. 5, the Internet is shown as 10, and two telco C.O.'s are shown as 12, having telephone switching systems 14 with interconnecting circuit 26, thus comprising elements of the PSTN. C.O.'s 12 have cross-reference databases 70 which contain a cross-reference of TN to IP for each Integrated Device subscriber for which service is provided out of the respective C.O. The C.O.'s also have access lines 24 to the Internet for carrying IP traffic. Integrated Device workstations 30 including the workstation labeled G have analog telephone lines 16 connecting them to the C.O. LAN 32 has access line 24 to the Internet. Elements 72, 74, 76, and one Integrated Device workstation 30 comprise a cable TV distribution system used for providing Internet access (so called "cable modem" service). A cable TV distribution hub is shown as 72, the cable itself as 74, and various other devices connected to the cable as 76. Also connected to the cable is an Integrated Device workstation 30, labeled H, which also has an analog phone line 16 connecting it to its local telco C.O. switching system 14.

In operation, if Integrated Device workstation G dials the TN for Integrated Device workstation H, the C.O. labeled G sends a call setup request to the C.O. labeled H via a messaging channel, as is customary. The message will incorporate a message element requesting an Internet connection, and requesting the IP address of H. The C.O. labeled H will receive the message, look up in its cross-reference to find the IP address for H, and send that address by return message to C.O. labeled G. The C.O. labeled G now having the IP address of the dialed TN, and knowing the IP address of G by looking up G's TN in its own cross-reference, will send an Internet message to G via the C.O.'s Internet access line 24. The message will contain the IP address for H. Workstation G will then send an appropriate message to workstation H requesting an Internet connection. Assuming that both devices agree to create the desired connection, an Internet connection is established and communication commences over the Internet.

In an alternative method of operation, C.O. G looks up the IP address of calling Integrated Device G and incorporates that IP address in the call setup request message that is sent to C.O. H. Since C.O. H is receiving the IP address of the caller in the call setup request message, it can forward that IP address along with the telephone number of the caller to the called device H. The called device H, upon receiving the IP address of the caller can then initiate an Internet communication with the caller, as before. Optionally, C.O. H could look up the IP address of the called device H and send that to the calling device G via C.O. G. In this optional arrangement, both the calling and called devices would have the IP address of the other, and a protocol specification would determine which would initiate an Internet communication to the other.

It should be obvious from the prior discussions that a cross-reference of TNs to IP addresses could be maintained at any number of places such as in an Internet DNS system, in the PSTN at a telco central office, in the devices themselves, or in other associated systems. For example, in FIG. 5, cable-TV distribution hub 72 might maintain such a cross-reference for its client workstations such as workstation H. Furthermore, the concept of a cross-reference of an IP address to a telephone number generalizes to relating an IP address to a PSTN device. For example, as stated previously, a device might be known to its serving central office by an alternative identifier rather than by its telephone number; the central office might then obtain the IP address for the device from its service records based on the alternative identifier.

In a similar vein, these discussions have identified the fact that there are a variety of ways in which an IP address could be delivered such that a calling and called device could communicate over the Internet. These possibilities include the following: the IP address information could be delivered to either or both of the calling and called devices; it could be delivered from one device directly to the other; it could be delivered by an Internet service such as a DNS server; or, it could be delivered by telco C.O.'s via the Internet, or via an ISDN-style messaging channel. Other mechanisms may be possible which will accomplish the intended purpose.

Additionally, mixed modes of operation are possible as defined by this invention. For example, assume that an Integrated Internet/PSTN communication were to take place between Integrated Device workstation F 60 behind the ISDN PBX 56 of FIG. 4, and Integrated Device workstation H 30 on the cable TV arrangement of FIG. 5. The telco C.O. H providing service to workstation H may supply the cross-reference of TN to IP for workstation H, but ISDN PBX 56 or the workstation 60 itself may provide the cross-reference information for workstation 60.

In contemplating connectivity arrangements in telco central offices, messaging schemes and protocols, and the like, as suggested by the previous discussions, it should be understood that there may be a myriad of ways of accomplishing these goals. For example, there is a substantial variety of equipment and systems used in telco central offices from numerous vendors, and so, for example, there might be any number of suitable ways of providing an Internet connection to a telco C.O. in order to provide an Internet messaging pathway to an Integrated Device. Similarly, the above discussions have portrayed messaging sequences that might take place in creating an Internet communication, and it should be understood that these are stylized sequences or protocols, and that the actual implementations might employ much more rigorous and sophisticated protocols for this purpose. In addition, the messaging processes might benefit from modifications, extensions, or enhancements to existing protocols for optimization to this purpose. However, the current lack of these modifications and the like should not be construed to prohibit this invention as they are implementation steps manageable by those knowledgeable in the art.

Having thus described the invention in rather full detail, it will be understood that such detail need not be strictly adhered to, but that further changes and modifications may suggest themselves to one skilled in the art falling within the scope of the present invention as defined by the subjoined claims.

What is claimed is:

1. A system for integrating the Internet with the PSTN comprising:
   (a) a calling device having the telephone number of a second device;
   (b) a resource which maintains a cross-reference of telephone numbers to IP addresses, having at least one such entry, and wherein said cross-reference is maintained in the PSTN; and
   (c) a means for said calling device to obtain an IP address associated with the telephone number of said second device, said IP address being obtained from said cross-reference resource;

whereby said calling device, having said IP address of said second device, initiates an Internet communication with said second device.

2. A system for integrating the Internet with the PSTN as recited in claim 1, wherein said calling device has an Internet connection.

3. A system for integrating the Internet with the PSTN as recited in claim 1, wherein said calling device has an Internet connection and a PSTN connection.

4. A system for integrating the Internet with the PSTN as recited in claim 1, wherein said means for said calling device to obtain said IP address are a query sent to said cross-reference resource by said calling device.

5. A system for integrating the Internet with the PSTN as recited in claim 1, wherein said means for said calling device to obtain said IP address comprises a query sent to said cross-reference resource by a communications service or agent acting on behalf of said calling device.

6. A system for integrating the Internet with the PSTN as recited in claim 1, wherein said means for said calling device to obtain said IP address are elements of the PSTN.

7. A system for integrating the Internet with the PSTN by initiating an Internet connection when a calling device calls the telephone number of a called device on the Public Switched Telephone Network (PSTN), comprising:

(a) a plurality of Integrated Devices, each having an Internet connection and a telephone number, the Internet connection having an associated Internet Protocol (IP) address, and the telephone number having an associated telephone connectivity, such that a connection for said Integrated Devices is established by telephonically dialing said telephone number via the PSTN;

(b) said Integrated Devices further comprising digital messaging capability to the PSTN;

(c) a calling device calling the telephone number of a called device, said calling and called devices being Integrated Devices;

(d) a first one of said calling and called devices providing its IP address to a second one of said calling and called devices by sending a digital message to said second one of said calling and called devices via the PSTN, wherein said digital message is addressed to the telephone number or other PSTN identifier of said second one of said calling and called devices; and (e) said second one of said calling and called devices being respondent to said first one of said calling and called devices by sending an Internet message to said first one of said calling and called devices' IP address, thereupon initiating an Internet communication between said calling and called devices.

8. A system for integrating the Internet with the PSTN by initiating an Internet connection when a calling device calls the telephone number of a called device on the Public Switched Telephone Network (PSTN), comprising:

(a) a plurality of Integrated Devices, each having an Internet connection and a telephone number, the Internet connection having an associated Internet Protocol (IP) address, and the telephone number having an associated telephone connectivity, such that a connection for said Integrated Devices is established by telephonically dialing said telephone number via the PSTN;

(b) said Integrated Devices further comprising digital messaging capability to the PSTN;

(c) said calling and called devices being Integrated Devices;

(d) the PSTN having a digital messaging capability for conveying messages containing IP addresses;

(e) means for the PSTN to obtain the IP address of a first one of said calling and called devices;

(f) means for the PSTN to provide said IP address of said first one of said calling and called devices to a second one of said calling and called devices; and (g) said second one of said calling and called devices being respondent to said provisioning of said IP address of said first one of said calling and called devices by sending an Internet message to said first one of said calling and called devices' IP address, thereupon initiating an Internet communication between said calling and called devices.

9. A system for integrating the Internet with the PSTN as recited in claim 8, further comprising means for maintaining a cross-reference of an In tegrated Device's telephone number or other PSTN identifier to its IP address, and wherein said means to obtain the IP address of a first one of said calling or called devices is provided by said cross-reference when the telephone number or other PSTN identifier of said calling or called devices is known.

10. A system for integrating the Internet with the PSTN as recited by claim 9, wherein said means for maintaining a cross-reference of an Integrated Device's telephone number or other PSTN identifier to its IP address is provided by the PSTN.

11. A system for integrating the Internet with the PSTN as recited by claim 9, wherein said means for maintaining a cross-reference of an Integrated Device's telephone number or other PSTN identifier to its IP address is provided by said Integrated Devices.

12. A system for integrating the Internet with the PSTN as recited by claim 9, further comprising facilities of the PSTN having connectivity to the Internet, and wherein said means to maintain a cross-reference of an Integrated Device's telephone number or other PSTN identifier to its IP address is provided by the Domain Name Service capability of the Internet.

13. A system for integrating the Internet with the PSTN as recited by claim 8, wherein said means for the PSTN to provide said IP address of said first one of said calling and called devices to a second one of said calling and called devices is provided by said digital messaging capability of the PSTN.

14. A system for integrating the Internet with the PSTN as recited by claim 8, further comprising facilities of the PSTN having connectivity to the Internet, and wherein said means for the PSTN to provide said IP address of said first one of said calling and called devices to a second one of said calling and called devices is provided by digital messages of the PSTN being sent via the Internet to said second one of said calling and called devices.

15. A method for integrating the Internet with the PSTN, comprising the steps of:

(a) providing a first device on the Internet with the telephone number of a second device;

(b) causing said first device to obtain an IP address associated with said telephone number of said second device from a resource in the PSTN which maintains a cross-reference of telephone numbers to IP addresses; and (c) causing said first device to send an Internet message addressed to the IP address of said second device, thereby creating an Internet communication between said first and second devices.

16. A method for integrating the Internet with the PSTN, comprising the steps of:

(a) providing to a first device on the Internet the telephone number of a second device;

(b) causing said first device to send a message containing said telephone number to a communications service or agent, requesting a connection to said second device;

(c) causing said communications service to obtain an IP address associated with said telephone number of said second device from a resource which maintains a cross-reference in the PSTN of telephone numbers to IP addresses;

(d) causing said communications service to provide said IP address to said first device; and (e) causing said first device to send an Internet message addressed to the IP address of said second device, thereby creating an Internet communication between said first and second devices.

17. A method for integrating the Internet with the PSTN wherein an Internet connection can be created between Integrated Devices, the user of one such device, or the device itself or an agent for the device, having available the telephone number of another Integrated Device, said Integrated Devices having Internet connectivity with an associated Internet Protocol (IP) address and having telephone connectivity with an associated telephone number, such that a connection for said Integrated Devices is established by telephonically dialing said telephone number via the PSTN, comprising the steps of:

(a) entering the telephone number of a called Integrated Device into a calling Integrated Device, said called Integrated Device to be communicated with via the Internet;

(b) sending said telephone number to the PSTN by said calling device via a digital messaging capability;

(c) establishing a digital messaging communications pathway between said calling and called devices by the PSTN;

(d) sending its IP address by a first one of said calling and called devices to a second one of said calling and called devices, said IP address being sent in a digital message via a digital message capability of the PSTN; and (e) sending an Internet message to said IP address of said first one of said calling and called devices by said second one of said calling and called devices, thereby initiating an Internet communication between said calling and called devices.

18. A method for integrating the Internet with the PSTN wherein an Internet connection can be created between Integrated Devices, the user of one such device, or the device itself or an agent for the device, having available the telephone number of another Integrated Device, said Integrated Devices having Internet connectivity with an associated Internet Protocol (IP) address and having telephone connectivity with an associated telephone number, such that a connection for said Integrated Devices is established by telephonically dialing said telephone number via the PSTN, comprising the steps of:

(a) entering the telephone number of a called Integrated Device into a calling Integrated Device, said called Integrated Device to be communicated with via the Internet;

(b) obtaining the IP address of a first one of said calling and called devices from a resource of the PSTN;

(c) providing said IP address of said first one of said calling and called devices to a second one of said calling and called devices; and (d) sending an Internet message to said IP address of said first one of said calling and called devices by said second one of said calling and called devices, thereby initiating an Internet connection between said calling and called devices.

19. A method for integrating the Internet with the PSTN as recited in claim 18, additionally comprising the steps of:

(a) maintaining within the PSTN a cross-reference of telephone numbers to IP addresses associated with Integrated Devices; and (b) obtaining said IP address from said cross-reference during said step of obtaining the IP address of a first one of the calling and called devices.

20. A method for integrating the Internet with the PSTN as recited by claim 19, wherein said step of obtaining said IP address from said cross-reference is performed by the PSTN.

21. A method for integrating the Internet with the PSTN as recited by claim 19, wherein said step of providing said IP address of said first one of said calling and called devices to a second one of said calling and called devices is performed by the PSTN via a digital messaging capability of the PSTN.

22. A method for integrating the Internet with the PSTN as recited by claim 19, wherein said step of providing said IP address of said first one of said calling and called devices to a second one of said calling and called devices is performed by the PSTN via digital messages sent on the Internet.

23. A system for creating a PSTN telephone connection to a called device initiated when a calling device enters the Internet name of the called device, comprising:

(a) a plurality of Integrated Devices, each of which has an Internet connection and a telephone number, said Internet connection having an associated Internet Protocol (IP) address permanently or dynamically assigned, and said telephone number having associated telephone connectivity such that said Integrated Devices can be connected to by dialing said associated telephone number via telephones on the PSTN;

(b) said called device comprising an Integrated Device;

(c) said calling device having an Internet connection and an IP address associated therewith, said IP address being either permanently or dynamically assigned;

(d) said called device having an Internet name associated with said IP address;

(e) an Internet Domain Name Service (DNS) maintaining a cross-reference of Internet names and IP addresses to telephone numbers;

(f) means for obtaining the telephone number of the called device from said DNS and providing it to the calling device; and (g) means for said calling device to initiate a telephone connection to said called device over the PSTN.

* * * * *